(12) United States Patent
Zhu et al.

(10) Patent No.: US 7,310,673 B2
(45) Date of Patent: Dec. 18, 2007

(54) NETWORK RESOURCE ASSIGNMENT SYSTEM AND METHOD

(75) Inventors: Xiaoyun Zhu, San Jose, CA (US); Sharad Singhal, Belmont, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 692 days.

(21) Appl. No.: 10/032,105

(22) Filed: Dec. 21, 2001

(65) Prior Publication Data

US 2003/0120780 A1  Jun. 26, 2003

(51) Int. Cl.
G06F 15/173 (2006.01)
(52) U.S. Cl. .................................................. 709/226
(58) Field of Classification Search ............... 709/202, 709/220, 223, 232, 226, 244, 224, 225; 703/2; 713/201; 370/468
See application file for complete search history.

(56) References Cited

U.S. PATENT DOCUMENTS

| | | | |
|---|---|---|---|
| 5,881,238 A * | 3/1999 | Aman et al. ................ 709/226 |
| 6,012,052 A * | 1/2000 | Altschuler et al. ............. 707/2 |
| 6,154,787 A * | 11/2000 | Urevig et al. ................ 710/8 |
| 6,230,200 B1 * | 5/2001 | Forecast et al. ............ 709/226 |
| 6,308,208 B1 * | 10/2001 | Jung et al. ................... 709/224 |
| 6,477,566 B1 * | 11/2002 | Davis et al. ................. 709/223 |
| 6,516,350 B1 * | 2/2003 | Lumelsky et al. ........... 709/226 |
| 6,591,290 B1 * | 7/2003 | Clarisse et al. ............. 709/205 |
| 6,771,595 B1 * | 8/2004 | Gilbert et al. .............. 370/229 |
| 6,854,013 B2 * | 2/2005 | Cable et al. ................ 709/226 |
| 6,947,987 B2 * | 9/2005 | Boland ........................ 709/226 |
| 6,968,323 B1 * | 11/2005 | Bansal et al. .................. 705/80 |
| 7,085,837 B2 * | 8/2006 | Kimbrel et al. ............. 709/226 |
| 2002/0053011 A1 * | 5/2002 | Aiken et al. ................. 711/170 |
| 2003/0028642 A1 * | 2/2003 | Agarwal et al. ............ 709/226 |

* cited by examiner

*Primary Examiner*—William Vaughn
*Assistant Examiner*—Yemane M Gerezgiher (57) ABSTRACT

The present invention is a system and method for facilitating efficient assignment of networked resources. In one embodiment, a resource assignment method is utilized to assist network resource assignment operations. The resource assignment method establishes a resource model, acquires an application model, and utilizes a mapping process to map said application model onto said resource model. In one exemplary implementation the resources are assigned to optimize the assignment of resources with respect to application requirements and desired objectives (e.g., minimization of the average communication delay inside a service core). In one exemplary implementation, a mapping process of a resource assignment method is utilized to map an application onto part of IDC topology.

11 Claims, 5 Drawing Sheets

100

110

Establish a resource model that descibes the configuration and characteristics of available resources.

120

Aquire an application model that describes the organization of application functional components and their respective requirements.

130

Utilize a mapping process to map the application model onto the resource model.

NETWORK RESOURCE ASSIGNMENT SYSTEM AND METHOD

FIELD OF THE INVENTION

The present invention relates to networked resource assignment.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, electronic systems designed to provide these advantageous results are realized through the use of networked resources that facilitate leveraged utilization of centralized resources. While the leveraged utilization of the centralized resources is advantageous, organization and assignment of the centralized resources is usually very complex and susceptible to wasteful implementations.

Centralizing certain resources within a distributed network typically provides desirable benefits. For example, centrally storing and/or processing information typically relieves the necessity of wasteful duplicative storage and/or processing resources at each remote networked node. However, managing large storage and processing capabilities of centralized resources is very complex and expensive. The current increase in demand for Applications Service Providers (ASPs) to provide additional services is largely attributable to the ever growing cost of information technology and the increasing complexity of managing mission critical Enterprise and Internet applications. To provide the typical requisite level of service, an ASP usually needs a highly available, scaleable, flexible and secure centralized infrastructure. An Internet Data Center (IDC) is one example of an attempt to provide such an infrastructure to an ASP or web site hoster for planning, deploying and managing complex applications.

Managing both the infrastructure and the application in a large and complicated centralized networked resource environment raises many challenging operational scalability issues. For example, it is desirable to share data center resources among different customers and applications to reduce operating costs. However, customers prefer dedicated resources that offer isolation and security for their applications as well as flexibility to host different types of applications. Attempting to assign or allocate resources in a centralized environment in an efficient manner which adequately addresses issues that are impacted by the assignment is very difficult.

The manner in which centralized resources are assigned and allocated is very important and the present common methods of manual assignment are typically inefficient and/or defective. The resources are often randomly assigned and do not adequately address customers needs for deployment in a timely fashion that facilitates reduced time-to-market availability of the applications. In addition, the dynamic nature and high variability of the workload in many applications, especially electronic business (e-business) applications requires that the resources allocated to an application be easily adjustable to maintain service level agreements (SLAs). Moreover, because multiple customers typically co-exist in a data center, it is important to allocate resources intelligently to avoid bottlenecks within the data center.

Resource assignment is also often necessary when incremental application adjustments are made. The latter is often referred to as "capacity on demand", which means resources (such as servers) are required to be added or removed from an application based on real-time workload and performance measurements. Some prior attempts at resource allocation depend upon abstractions of servers and/or services. These prior attempts require modeling that is susceptible to critical system and application specific information getting lost in an abstraction.

What is required is a system and method for facilitating efficient assignment of networked resources.

SUMMARY OF THE INVENTION

The present invention facilitates efficient assignment of networked resources. In one embodiment of the present invention, a resource assignment method is utilized. The resource assignment method establishes a resource model, acquires an application model, and utilizes a mapping process to map the application model onto the resource model. In one embodiment of the present invention, the resources are assigned to optimize the assignment of resources with respect to application requirements and desired objectives (e.g., minimization of the average communication delay between resources). In one exemplary implementation, the present invention also uses dynamic resource provisioning and automatic application deployment to facilitate shortening the time period to deploy an application. In one embodiment of the present invention a resource assignment method is utilized as part of a resource assignment service (RAS) to assign resources. In one example, a mapping process of a resource assignment method is utilized to map an application onto part of an IDC topology.

DETAILED DESCRIPTION OF THE INVENTION

Reference will now be made in detail to the preferred embodiments of the invention, a network resource assignment system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions which follow are presented in terms of procedures, logic blocks, processing, and other symbolic representations of operations on data bits within an electronic system. These descriptions and representations are the means used by those skilled in the digital arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic, signals capable of being stored, transferred, combined, compared, and otherwise manipulated in the electronic system.

It has proven convenient at times, principally for reasons of common usage, to refer to the signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or as apparent from the following discussions, it is appreciated that throughout the present invention, discussions utilizing terms such as processing, computing, calculating, determining, displaying or the like, refer to an action or processes of an electronic device that manipulates and transforms data represented as physical (electronic) quantities within the system (e.g., within registers, logic gates, memories, etc.) into other data similarly represented as physical quantities within the system devices or other such information storage, transmission or display devices.

The present invention facilitates the assignment or allocation of networked resources. In one embodiment, the present invention is utilized to assign resources (compute nodes, storage nodes and networking components) such that application requirements and desired objectives are met. In one exemplary implementation, the desired objective is to minimize average communication delay between resources assigned to the application. In one embodiment, the present invention utilizes characteristics and features of the resources and applications to expedite and simplify processing of resource assignment analysis. In one exemplary implementation, the present invention is utilized to assign resources in an Internet Data Center (IDC) to an application.

In one embodiment of the present invention, data center resources are partitioned into service cores to facilitate resource management and scalability. Service cores are portions of data center resources (e.g., groups of servers) that are managed as a unit and are utilized as easily replicable building blocks in large data centers. In one embodiment, each data center includes multiple service cores that comprise a plurality of resources (e.g., between 100 and 1000 servers in each service core) that are capable of accommodating (e.g., hosting) many applications or customers. In one exemplary implementation, the resources in a service core include servers (e.g., computation and storage nodes) and networking components (switches, routers, firewalls, and load balancers). The present invention is readily adaptable for service cores that provide a variety of management functions for these resources, including networking management, storage management, server management, firewall management, load balancer management, etc.

Figure 1:
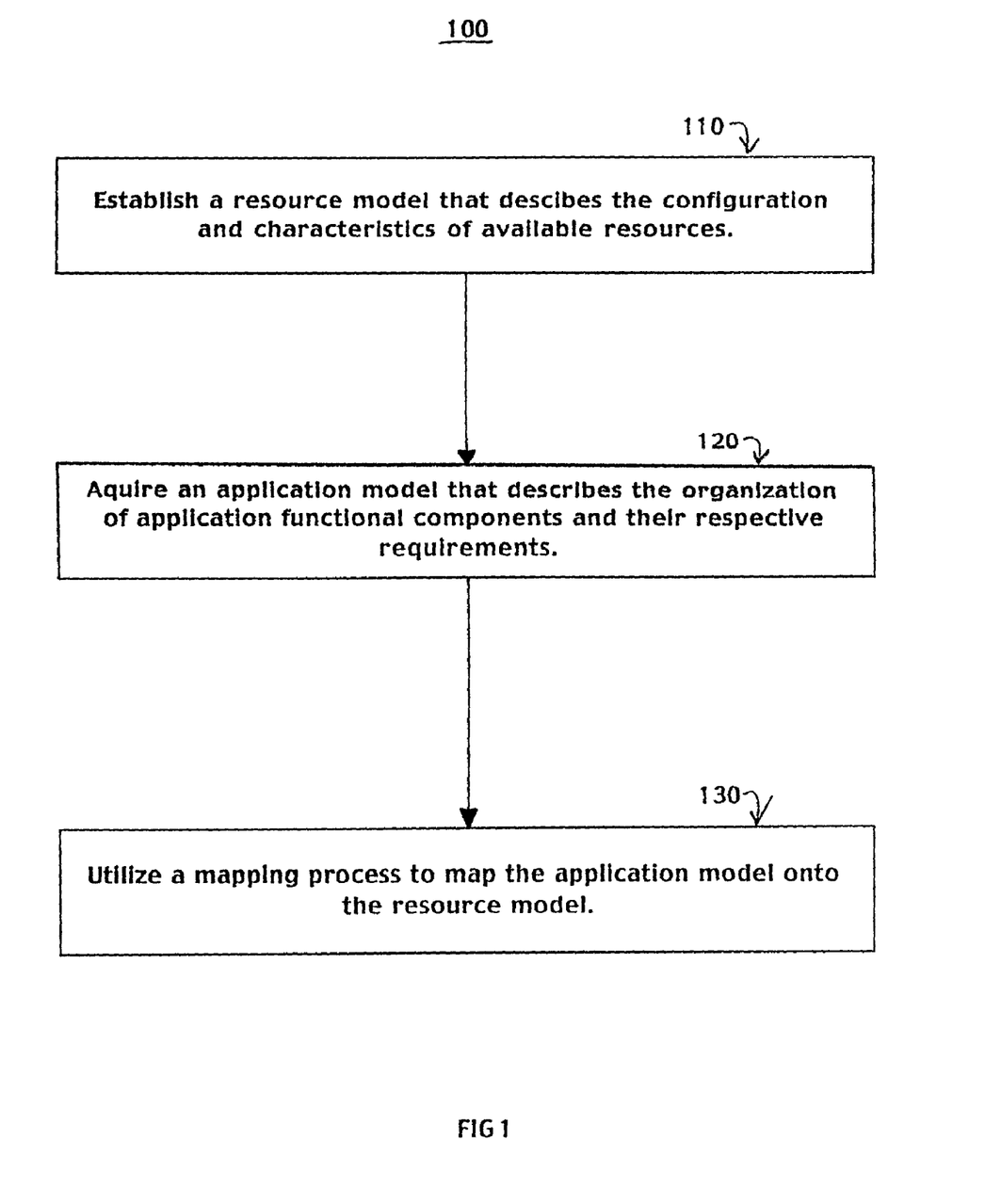
FIG. 1 is a flow chart of one embodiment of a present invention resource assignment method.

FIG. 1 is a flow chart of resource assignment method 100, one embodiment of the present invention. When an application is ready to be deployed, resource assignment method 100 is activated in one exemplary implementation of the present invention. In one embodiment of the present invention, resource assignment method 100 facilitates the assignment of resources in an optimal manner based upon desired objectives, available resources and application requirements.

In step 110, a resource model that includes configuration and characteristic information associated with available resources is established. In one exemplary implementation, a resource model includes information associated with a service core comprising two resources classified by the function they provide (e.g., servers and switches). In one embodiment of the present invention, establishing a resource model includes obtaining topology and resource parameters (e.g., performance attributes) that characterize the service core resources. In one exemplary implementation of the present invention, the set of resource parameters include the number of edge switches (e.g., designated by the variable $N^E$), the number of rack switches (e.g., designated by the variable $N^R$), the number of server nodes (e.g., designated by the variable M), as well as the connectivity matrices (e.g., designated by the variables $H^{RN}$, $H^{ER}$ and $H^{EN}$) between different layers of the network topology.

The capacity and computing power of each server can be modeled in one embodiment using a set of attributes (e.g., designated by the variable A), for example, processor speed, number of processors, disk capacity, disk bandwidth, and memory size. In addition, the bandwidth limits of the incoming links (e.g., designated by the variable $B^{NI}$, $B^{RI}$ and $B^{EI}$) and outgoing links (e.g., designated by the variables $B^{NO}$, $B^{RO}$ and $B^{EO}$) at various layers of the network are specified in one embodiment. In one exemplary implementation, after each service core has been built and pre-wired, a resource configuration template (e.g., res_conf) is created to store the resource configuration and parameters.

Figure 2:
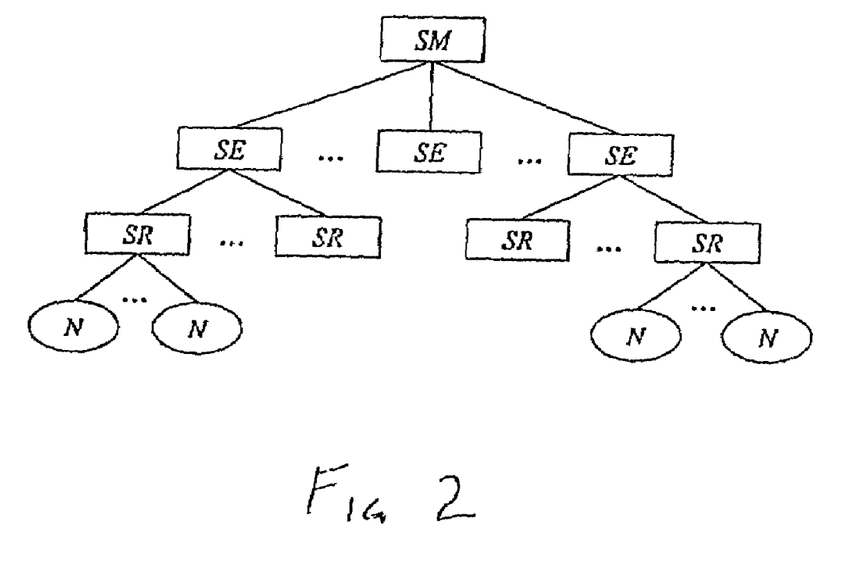
FIG. 2 shows the physical topology of one embodiment of a service core.

FIG. 2 shows the physical network topology of one embodiment of a service core. The network topology is a tree-like structure comprising multiple layers of resources including a switch mesh (SM), a number of edge switches (SE), rack switches (SR), servers (N), and network links between the components. It is appreciated that the present embodiment can be generalized to any number of devices and layers. In one embodiment of the present invention, the delay inside the switch mesh is ignored so that the switches that make up the mesh can be viewed as one single node in the tree. The servers (N) are coupled to the rack switches (SR) which are coupled to the edge switches (SE) which in turn are coupled to the switch mesh (SM). In FIG. 2 the nodes represent the servers and switches, and the edges represent the links that connect them. In one exemplary implementation, the links are duplex links that permit traffic to flow in either direction.

Figure 3:
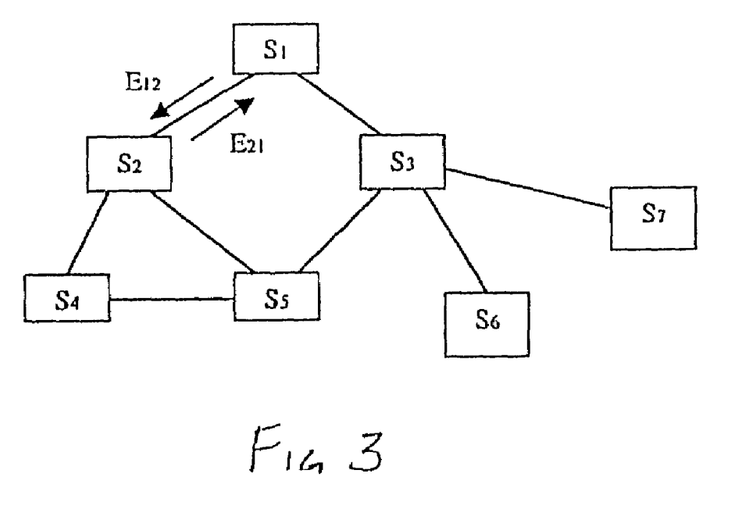
FIG. 3 is a block diagram of one embodiment of a set of communicating servers utilized to run a distributed application.

Referring again to FIG. 1, an application model that includes information associated with application functional components is acquired in step 120. In one embodiment of the present invention the information included in an application model describes the organization of application functional components and their respective requirements. The organization of application functional components defines an arrangement of resources based upon functionality. In general, a distributed application needs resources that provide functionality for implementing application operations. FIG. 3 is a block diagram of one embodiment of an application model functional component organization. Each box represents an application functional component (e.g., a type of server), while each line between a pair of application functional components indicates traffic is permitted to flow between the two connected application functional components. In one exemplary implementation, different application functional components (e.g., servers) have different functionalities. For example, S1 can be a web server, or S6 can be a file server. In another exemplary implementation, a multi-tier web application which is a special case of the previously presented organization is deployed, where servers with the same functionality form a cluster for load balancing purposes, and different clusters may or may not reside in the same network.

In one embodiment of the present invention the resource requirements of an application include the number of application functional components; the network traffic requirements between the application functional components; and upper and lower bounds on server attributes which are required for the server to host the application functional component. The application model also comprises information delineating the resource performance requirements directed to server attributes and network bandwidth in one implementation. In one exemplary implementation, the range of the server attributes is specified (e.g., the processor speed of S1 should be 400~600 MHz). For network bandwidth, a traffic matrix (e.g., E) is used to characterize the maximum amount of traffic going from one server to another in one exemplary implementation. For example, matrix element E12=0.5 Mbps, E21=1 Mbps, and E15=0 means that S1 requires 0.5 Mbps bandwidth to S2, S2 requires 1 Mbps bandwidth to S1 and S1 does not communicate directly with S5. In one embodiment of the present invention, these parameters are wrapped into an application requirement template (e.g., app_req). In one exemplary implementation, the requirement template is specified either by the customer or by a separate capacity planning service.

Referring back to method 100 shown in FIG. 1, a mapping process is utilized to map the application model onto the resource model in step 130. For example, application functional components and their requirements are matched up with and assigned to resources (e.g., within a service core). In one exemplary implementation, the mapping process includes determining which network center resources (e.g., server nodes in FIG. 2) should be assigned to application function components (e.g., S1 through S7 in FIG. 3). In one embodiment of the present invention, the assignment of resources is captured by an assignment decision variable (e.g., a matrix variable X) that is optimized in accordance with a desired objective (e.g., minimizing the average communication delay among the servers).

In one embodiment of the present invention, the mapping process of the present invention is directed to increasing the optimization of resource utilization through appropriate assignment of resources to an application with respect to desired objectives. In one exemplary implementation, the desired objectives include meeting application specific requirements (e.g., requisite server capabilities and communication link bandwidths). In some embodiments of the present invention, determining optimized assignments involves complicated analysis and complex operations (e.g., solving hard combinatorial problems with constrained non-linear integer programming). The present invention takes advantage of resource and application attributes in an exemplary implementation that permits simplification of otherwise complicated resource assignment analysis such as those utilizing exhaustive search methods to find a guaranteed global optimum. In one embodiment of the present invention, a layered partitioning and pruning (LPP) algorithm or process is utilized to find an optimal solution. In one exemplary implementation with very large service cores, a local clustering scheme to find relatively optimized solutions that may not be a guaranteed global optimum but that does provide significant beneficial performance without the expensive extensive analysis that would otherwise be required.

In one embodiment of the present invention, multiple applications are considered at the same time when determining resource allocation. Considering multiple applications at the same time may increase the complexity of determining resource allocation. In one embodiment of the present invention, the complexity of determining resource allocation is reduced by sequentially assigning one application at a time. In one exemplary implementation of sequential assignment, the resources assigned to or "consumed by" the considered application are removed from a list of an available resource pool before the next application is planned. The sequential one at a time approach is simple and recursive in nature and is well suited to situations in which applications are added or removed from data centers over time.

Figure 4:
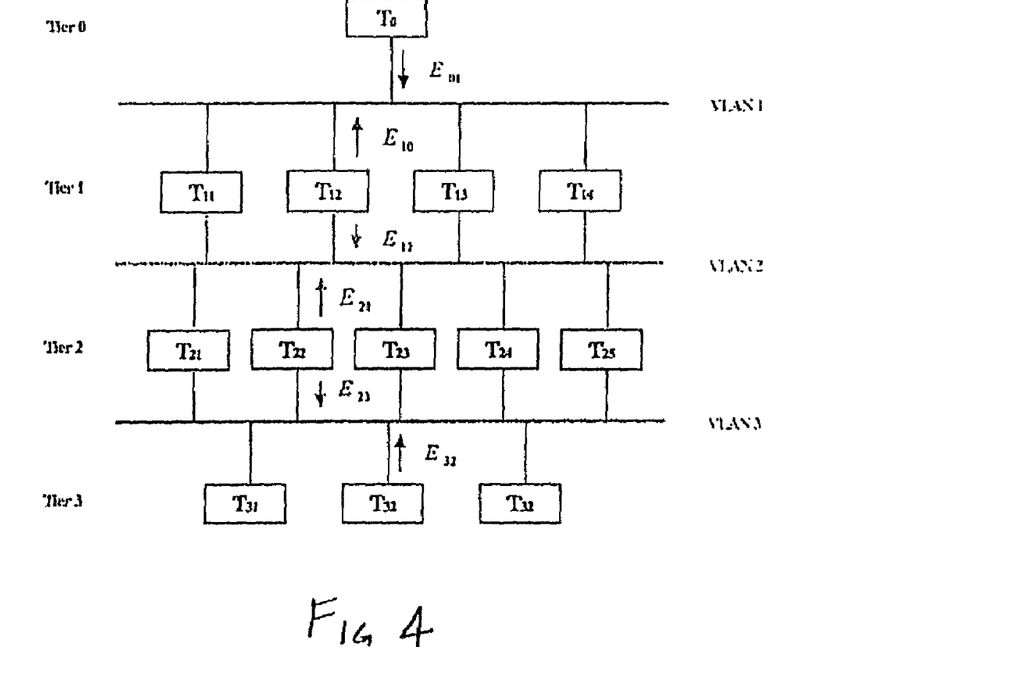
FIG. 4 is a block diagram of one exemplary implementation of running a three-tier e-commerce application in a data center.

The present invention is readily adaptable for use in assigning resources to applications with multiple organizational tiers, where a variable (e.g., D) indicates the number of tiers in the configuration. FIG. 4 is a block diagram of one embodiment of a Web application organization with a three-tier architecture comprising front-end Web server functional components, application server functional components, and back-end database server functional components. In one exemplary implementation, a customer desires to run a three-tier e-commerce Web application in a data center. Neighboring tiers are connected through a virtual LAN (VLAN). Tier zero (0) is an abstraction of the connection to the Internet and the detail of component T0 (e.g., a router) is not important in the present model. A resource distribution vector (e.g., C) determines the distribution of application functional components (e.g., servers) among the tiers. In one embodiment, the resource distribution vector (C) is a total tier (e.g., D) dimension vector where the number of servers in each tier (e.g., Ci) is known a priori.

The present invention is capable of taking advantage of application characteristics or requirements that facilitate simplification of resource assignment service activities. For example, there are application characteristics that permit simplifying flexibility with respect to server and bandwidth attributes. In one embodiment of the present invention, application functional components (e.g., application server functional components) in the same tier have similar functionality and uniform resource attribute requirements.

In one exemplary implementation, the application server functional component requirements are characterized using a lower bound requirement matrix (L) and an upper bound requirement matrix (U). For example, L and U are DxK matrices where $L^i_k$ and $U^i_k$ are the lower bound and the upper bound for the kth attribute of the application server functional components in the ith tier. For example, if the application server functional components on a first tier require 5 to 8 processors with at least 400 Mhz speed, then $L_{11}=5$, $U_{11}=8$, $L_{12}=400$, $U_{12}=\infty$.

In one embodiment of the present invention, traffic between the application functional components (e.g., application server functional components) have predetermined characteristics. For example, different application server functional components in the same tier generate the same amount of traffic, traffic coming into each tier is evenly distributed among all the application server functional components and no traffic goes between application server functional components in the same tier. In one exemplary implementation, a traffic matrix (E) is utilized in which $E_{i\hat{i}}$ indicates the maximum amount of traffic going from each server in the i'th tier to each server in the î'th tier. In addition, two scalar parameters $E_{01}$ and $E_{10}$ are used to capture the traffic coming into and going out of the service core. Using these parameters, the total amount of incoming and outgoing traffic is calculated at each server in different tiers, denoted by two Dx1 vectors $E^I$ and $E^O$ respectively.

In one embodiment the present invention is capable of utilizing a variety of assignment decision variables (e.g., a matrix variable X) that are optimized in accordance with many possible objectives (e.g., minimizing the average communication delay among the servers). In one exemplary implementation, the assignment decision variable is a matrix variable X, where $X_{ij}=1$ when jth server node is assigned to the ith tier and 0 otherwise. In one exemplary implementation, the assignment decision variable X is a DxM matrix where D is the number of tiers and M is the total number of servers available in the service core. In one embodiment of the present invention, a number of constraints are placed on the assignment decision variable to comply with desirable efficiency objectives.

In one exemplary implementation there are nine constraints. The first constraint is the number of servers allocated to the ith tier is $C_i$. The second constraint is each server is only assigned once for each application. The third constraint is attribute values for each server assigned satisfy application upper and lower bound conditions. The fourth and fifth constraints are for links that connect the servers to the rack switches. They constrain the traffic going in and out of the servers to the bandwidth of the links connecting them to rack switches. Next the bandwidth constraints for the links that connect the rack switches to the edge switches are considered. The outgoing traffic at the qth rack switch should be the total amount of traffic generated by connected servers under the switch reduced by the traffic sent within the same group of servers. The maximum outgoing traffic is subject to the bandwidth limit of the corresponding outgoing link. This produces a sixth constraint directed to the outgoing traffic at the rack switches and similarly a seventh constraint for incoming traffic at the rack switches. With a similar derivation, an eighth constraint and ninth constraint directed to outgoing traffic and incoming traffic (respectively) that connects connect edge switches to the mesh switches.

In one embodiment of the present invention, the goal of the optimization is to minimize the average communication delay inside the service core for each application without violating the above constraints. In one exemplary implementation, a resource traffic variable indicates the amount of traffic that goes through the resource. For example, $F^R$, $F^E$, and $F^M$ indicate the total amount of traffic between the server pairs that are connected through a rack, edge, and mesh switch respectively. The number of hops variable (e.g., $N_h$) for each data packet to go through is used as an estimate of the communication time. Hence the objective function is defined as the total amount of traffic going through the switches weighted by the corresponding number of hops:

$$\hat{J}=N_h^R F^R + N_h^E F^E + N_h^M F^M$$

and in simplified notation, instead of minimizing $\hat{J}$ the following objective function is maximized:

$$J=Tr(Y^R)+Tr(Y^E)=Tr(H^{RN}X'EXH^{RN'})+Tr(H^{EN}X'EXH^{EN'})$$

Thus, the optimization problem to be solved in the present implementation directed to minimizing traffic delays in the service core within the exemplary constraints described above is given by:

$$\max_X Tr(H^{RN}X'EXH^{RN'}) + Tr(H^{EN}X'EXH^{EN'})$$

$$s \cdot t \cdot X 1_M = C \quad (1)$$

$$X'1_D \leq 1_M \quad (2)$$

$$L'X \leq (1_{K \times D}X) \circledast A \leq U'X \quad (3)$$

$$X'E^O \leq B^{NO} \quad (4)$$

$$X'E^I \leq B^{NI} \quad (5)$$

$$H^{RN}X'E^O - \text{diag}(H^{RN}X'EXH^{RN'}) \leq B^{RO} \quad (6)$$

$$H^{RN}X'E^I - \text{diag}(H^{RN}X'EXH^{RN'}) \leq B^{R1} \quad (7)$$

$$H^{EN}X'E^O - \text{diag}(H^{EN}X'EXH^{EN'}) \leq B^{EO} \quad (8)$$

$$H^{EN}X'E^I - \text{diag}(H^{EN}X'EXH^{EN'}) \leq B^{E1} \quad (9)$$

This expression of the problem is accurate and a guaranteed global optimum is attainable in one embodiment of the present invention. In another embodiment of the present invention, the problem is reformulated and simplified since the objective function is quadratic and the constraints contain quadratic inequalities. The optimization involves constrained nonlinear programming, which may not be easily solved by directly applying conventional linear programming packages. Furthermore, the binary constraint of the decision variable adds to the complexity of an already difficult problem due to its combinatoric nature.

In one embodiment of the present invention, a process or algorithm that reduces the complexity of the problem is utilized to avoid an exhaustive search method to find a global optimum. A simple backtracking algorithm on the row vectors of the decision variable matrix (e.g., X) can be used to enumerate the components of the decision variable matrix that satisfy the first and second constraints. In one exemplary implementation, Ω is the set of all such decision matrices (e.g., X). Next the problem is simplified by identifying all infeasible resources (e.g., infeasible servers). In one exemplary implementation, the infeasible resources are identified based upon constraints 3 through 5. This produces a set (e.g., $\Omega_f$) for all such decision matrices (e.g., X) that form a combined feasibility matrix. Symmetry is another special property of service cores that the present invention takes advantage of to reduce the complexity. In one embodiment, the number of servers assigned to each tier under each rack switch (e.g., matrix $X^R$) is important in consideration of a projection map, where $\Omega_F^R$ is the image set of $\Omega_F$ under the map. The original optimization problem is simplified and reformulated as:

$$\max_{X^R \in \Omega_F^R} Tr(X^R E X^R) + Tr(H^{ER} X^R E X^{R'} H^{ER'})$$

where only the sixth through the ninth constraints remain.

Therefore the search algorithm can be broken into two steps in one embodiment of the present invention. The first step solves the above optimization problem and finds one matrix $X^{R*}$ that maximizes J. The second step converts $X^{R*}$ back to X that determines the optimal assignment for each server. In one embodiment of the present invention, this conversion is a one to many mapping. In one exemplary implementation the criterion used in the algorithm is to assign more powerful, high-end servers to tiers with more stringent requirements to promote higher utilization of the servers.

In one embodiment, the present invention also provides methods for efficiently solving the reformulated optimization problem in $X^R$. In one embodiment of the present invention, the $X^R_q$ is the qth column vector in the matrix $X^R$ that indicates the distribution of servers under the qth rack switch. Again a backtracking algorithm can be employed, which transverses the state space tree of all possible values for each $X^R_q$.

In one embodiment of the present invention a pruning technique is utilized to reduce the size of the state space tree in a backtracking algorithm. The service core is partitioned by individual edge switches, and further partitioned by the rack switches under each edge switch. The resulting algorithm is referred to as the layered partition and pruning (LLP) algorithm. In one embodiment of the present invention, the LLP algorithm is performed in steps. In the first step, for p=1, . . . , $N^E$, do backtracking on $X^E_p$, use constraints (8) and (9) to prune infeasible nodes. In the end, for each $X^E$, compute $J^E = \Sigma_{p=1}^{N^E} J_p^E = \Sigma_{p=1}^{N^E} (X_p^E) E X_p^E$. In the second step, for each p=1 . . . , $N^E$, with each value of $X^E_p$, do backtracking on $$X_q^R, q \in Q_p \text{ with } X_p^E = \sum_{q \in Q_p} X_q^R.$$

Use constraints (6) and (7) to prune infeasible nodes. Find the combination of feasible $X_q^{R*}$, $q \in Q_p$, that maximizes $J_p^R$, record $X_q^{R*}$, $q \in Q_p$ and $J_p^{R*}$. In Step 3, for each value of $X^E$, compute $J^R = \Sigma_{p=1}^{N^E} J_p^{R*}$ and $J = J^E + J^R$. Find $X^E$ that maximizes J and the corresponding $X^{R*}$ recorded earlier. Convert $X^{R*}$ into $X^*$ in the fourth step.

Compared to a direct backtracking algorithm on $X^R$ that searches in $\Omega^R_F$, the above algorithm has two main advantages. First by partitioning the network with individual edge switches, the search of partially optimal $X^{R*}_q$ becomes local under each edge switch. Second, by separating the edge layer from the rack layer, many evaluations only involve matrix multiplications with $X^E_p$, which is of a fairly low dimension. In addition, since each $X^E_p$ value corresponds to a set of $X^R_q$ values, infeasible solutions are removed quickly. These features result in a significant reduction in the total amount of processing required to complete the algorithm.

Figure 5:
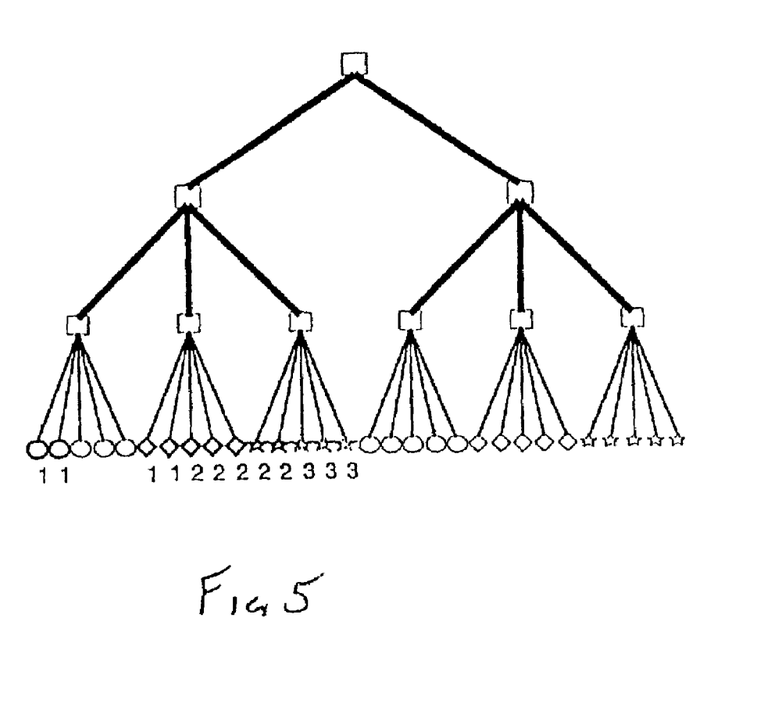
FIG. 5 is a block diagram of an exemplary application deployed in a small service core.

The Web application organization shown in FIG. 4 is a special case of the general configuration in FIG. 3. The application requires 4 front-end web servers (tier 1), 5 application servers (tier 2) and 3 back-end database servers (tier 3), with every two neighboring tiers connected through a VLAN. In one embodiment, the application is deployed in a small service core as shown in FIG. 5, comprising 30 server nodes, a switch mesh, 2 edge switches and 6 rack switches. Each rack switch is connected to 5 servers of a particular class, where class-1, -2, and -3 servers are represented by circles, diamonds, and stars, respectively. The three rack switches under each edge switch are connected to servers of class 1, 2, and 3, respectively. The mesh, edge and rack switches are represented by squares. The lines represent the links that connect the switches and the servers, with the line width indicating the relative bandwidth. The optimal assignment found by the LPP algorithm is also demonstrated. The numbers below the servers indicate which tier the corresponding server is assigned to.

For the planning of multiple applications in a single service core, the following iterative approach is utilized in one embodiment of the present invention. A resource allocation method (e.g., resource allocation method 100) is activated when a new assignment request is received. First it establishes a resource model and obtains information about the resource pool. Then it acquires an application model and checks to see if there are enough free resources that can meet the organization and performance requirements of the application. If not, the assignment of resources from the present service core for application is rejected and the application is referred to another service core, where a similar resource allocation procedure will be performed. If there are enough free resources an optimal resource assignment is made and an application deployment service is activated to start configuring the servers and the network. After the application has been deployed, the assigned resources consumed are subtracted from the free resource pool, and the allocation system waits to serve the next application. An alternative approach when there are not enough resources to support the given requirements of the application is to reevaluate the application requirements and see which ones can be relaxed or renegotiated.

In one embodiment of the present invention, a resource allocation method is also activated when incremental assignment is invoked by the dynamic resource management service. The latter is referred to as "capacity on demand," which means servers can be added to or removed from an application based on real-time workload requirements and performance measurements. The initial LLP algorithm (LLP_INT) for the initial assignment is easily modified to provide an additional LLP (LLP_ADD) to determine which resources should be added to an application. The initial LLP algorithm (LLP_INT) is also easily modified to provide a removal LLP (LPP_REM) to determine which resources are removed from an application when capacity demand has changed.

Figure 6:
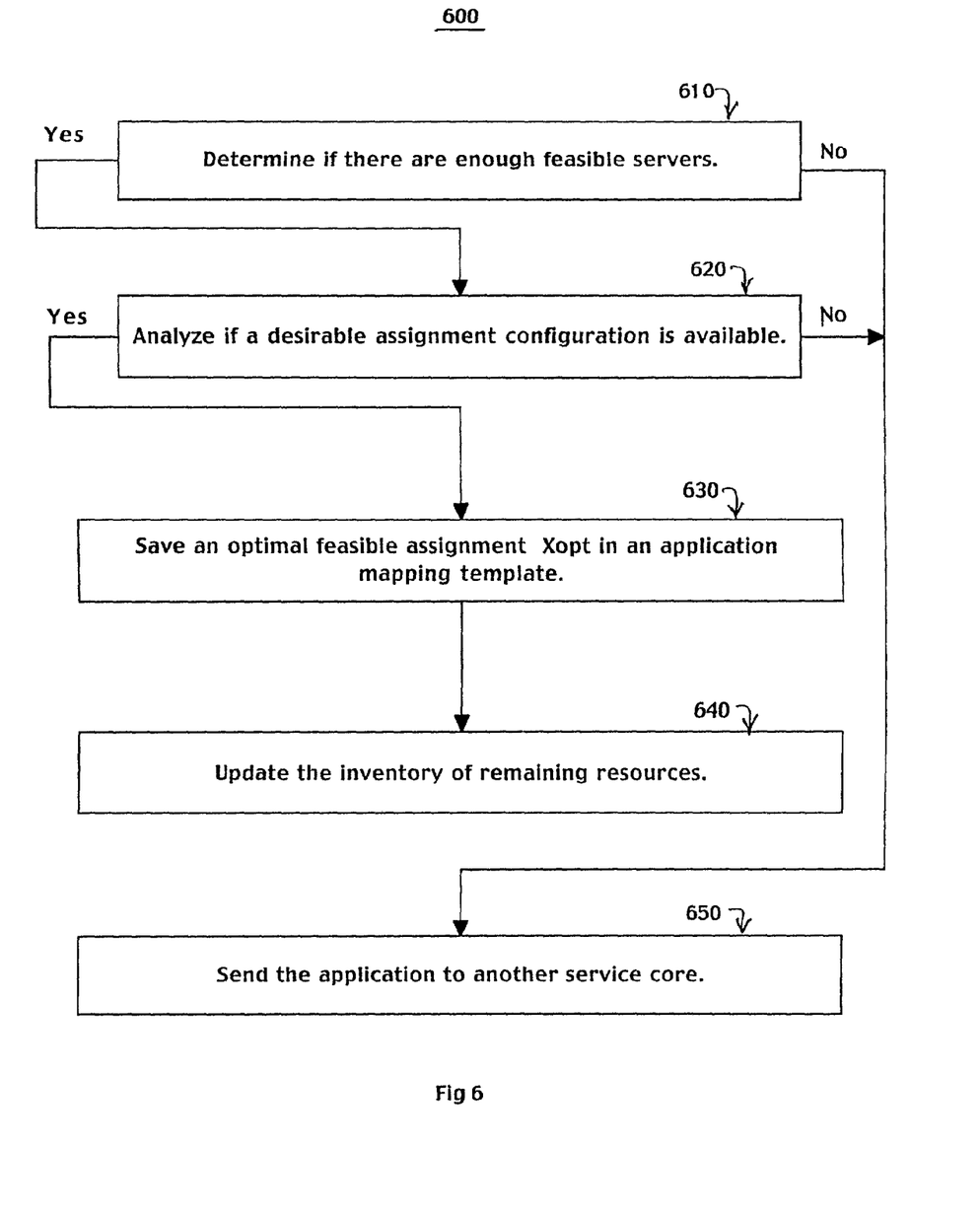
FIG. 6 is a flow chart of one embodiment of a present invention mapping process utilized in a present invention resource assignment method.

FIG. 6 is a flow chart of application resource mapping process 600, one embodiment of a present invention mapping process utilized in step 130.

In step 610 a determination is made if there are enough feasible servers. If there are not enough feasible servers an indication is provided indicating there are not enough feasible servers and the process proceeds to step 650. If there are enough feasible servers the process proceeds to step 620.

In step 620 analyze if a desirable assignment configuration is available. In one embodiment of the present invention, parameters are entered into an LLP algorithm to search for an optimal feasible assignment variable (e.g., Xopt). If there are no possible feasible assignments, an indication is provided that there are not enough resources within the a portion of a data center (e.g., a service core) and the process proceeds to step 650.

In step 630, the optimal feasible assignment variable (e.g., Xopt) is saved in an application mapping template (e.g., app_map) and sent to an application deployment service.

In step 640 the remaining resources are computed and the resource configuration template (e.g., res_conf) is updated.

In step 650 the application is sent to another portion of a data center (e.g., another service core).

Figure 7:
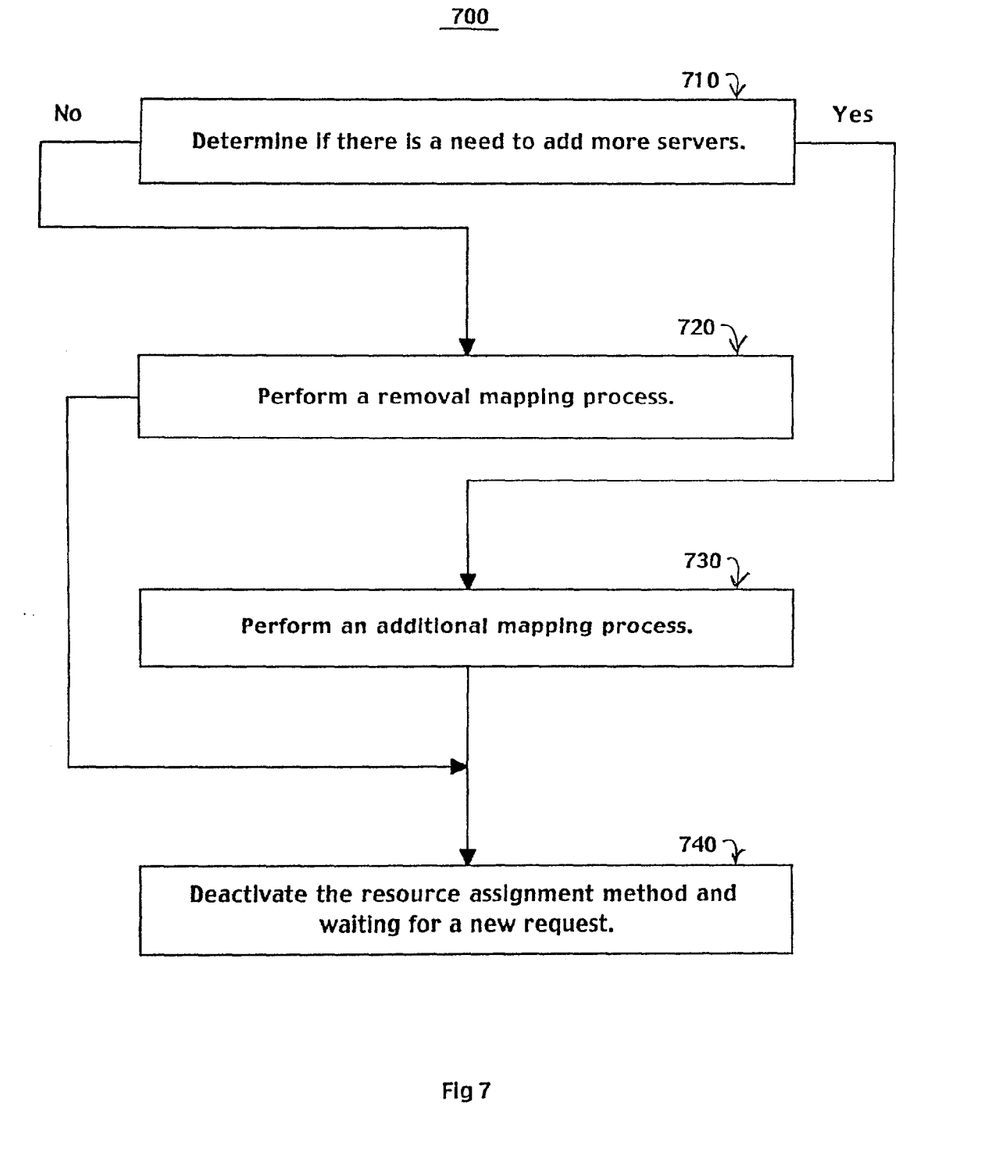
FIG. 7 is a flow chart of another embodiment of a present invention mapping process utilized in a present invention resource assignment method.

FIG. 7 is a flow chart of application resource mapping process 700 which is one embodiment of a present invention mapping process utilized in step 130 and is aimed at providing incremental resource assignment service.

In step 710 a determination is made if there is a need to add more servers. In one embodiment of the present invention, the current application mapping template (e.g., app_map) is read and compared to the application requirements (e.g., app_req) to obtain change requirements. If more servers are required the process jumps to step 730. If more servers are not required the process proceeds to step 720.

In step 720 a removal mapping process is performed. In one embodiment of a removal mapping process an LLP_REM algorithm is called to find an optimal set of servers to remove. In one exemplary implementation, a removal variable (e.g., Xrem) is defined. An application map file (e.g., app_map) is updated to indicate the servers included in Xrem and sent to server removing service. Then new remaining resources are computed and a resource configuration file (e.g., res_conf) is updated.

In step 730 an additional mapping process is performed. A determination is made if there are enough feasible servers. If not an indication is provided that there are not enough feasible servers and the process jumps to step 740. If there are enough feasible servers an addition mapping process LLP_ADD algorithm is called to find an optimal set of servers to add. In one exemplary implementation, an addition variable (e.g., Xadd) is defined. If the search is not successful an indication that there is not enough network bandwidth is provided and the process proceeds to step 740. If the search is successful, the application mapping file is updated with indications of servers added by Xadd and sent to the server adding service. Then remaining resources are computed and the resource configuration file is updated.

In Step 740 a resource assignment method is deactivated and waits for a new request.

The present invention is also readily adaptable to special complicated conditions encountered when allocating resources in large-scale systems. In one embodiment, an assignment solution is determined using a local clustering scheme. Instead of searching through all the edge switches, a cluster is picked using heuristics directed to the best solution and the resource assignment method is applied to the cluster. In one exemplary implementation the cluster is from a group of clusters each comprising a number of neighboring edge switches. In one exemplary implementation, the connections between local servers have a minimal communication delay since the servers are close to one another. For example, an assignment with servers located in one rack has a lower communication delay than a distributed solution in one embodiment and with other constraints being satisfied it is more desirable to have resources (e.g., servers) located closely. In one embodiment, edge switches are used as the basis for a partition algorithm and a unit in clustering. In one embodiment of the present invention, multiple local clusters are searched for available resources and the cluster that provides an optimal solution is utilized.

In one embodiment of the present invention, resource assignment method 100 is implemented on a computer system. The computer system comprises a memory for storing instructions (e.g., on a computer readable medium) for implementing resource assignment method 100 coupled to a bus for communicating the instructions to a processor that executes the instructions. In one exemplary implementation, the computer system establishes a resource model, acquires an application model, and utilizes a mapping process to map the application model onto the resource model. In one exemplary implementation of the present invention, the application resource mapping process 600 is implemented on the computer system. In one exemplary implementation of the present invention, the application resource mapping process 700 is implemented on the computer system.

According to another embodiment of the present invention, there is a resource allocation system comprising: a means for gathering information associated with available networked resources; a means for extracting information associated with application functional components; and a means for assigning application functional components to said available networked resources in accordance with a resource allocation variable. In one embodiment, the means for assigning application functional components to said available networked resources allocates the available networked resources by optimizing the utilization of the available networked resources identified in the resource allocation variable with respect to application constraints and desired objectives. In one exemplary implementation of the resource allocation system, the information associated with the available networked resources includes configuration and performance characteristics of the available networked resources and information associated with the application functional components includes the organization and networked resource requirements of the application functional components. In one embodiment, the means for assigning application functional components to the available networked resources includes a means for simplifying the assignment analysis by identifying infeasible networked resources and partitioning the available networked resources.

Thus, the present invention specifically addresses the problem of finding out whether there are enough free resources for a particular application and if so, decides which resources to allocate to it. The assignment utilizes a free pool of data center resources (computing, networking, storage, etc.) in a service core and customer application information associated with critical configuration and performance requirements. Instead of randomly choosing the resources from the free pool, the present invention assigns the resources in an optimum way such that the average communication delay between resources is minimized. The above technique can be used to create a resource assignment service (RAS). This service together with dynamic resource provisioning and automatic application deployment can potentially shorten the time period to deploy an application in an IDC from the current a few months or weeks to within days.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A resource assignment method comprising:
   establishing a resource model;
   acquiring an application model, wherein said application model describes a plurality of application functional components and includes information about which application functional components communicate with each other;
   obtaining a set of parameters associated with topology and performance characteristics of resources in a data center, said parameters comprising:
   a number of edge switches, a number of rack switches, a number of server nodes, and connectivity matrices between different layers; and
   a specification of the bandwidth limits of the incoming and outgoing links at various layers of the network:
   acquiring information about resource requirements of an application; and
   utilizing a mapping process to map said application model onto said resource model, wherein said mapping process is directed to increasing the optimization of resource utilization through appropriate assignment of resources to an application by identifying infeasible networked resources and partitioning the available networked resources with respect to desired objectives and wherein said mapping process is enabled to map a first application model onto a first resource model and a second application model onto a second resource model.

2. The resource assignment method of claim 1 wherein said information about resource requirements of an application include:
   a number of application functional components;
   a network traffic requirements between said application functional components; and
   upper and lower bounds on server attributes which are required for said server to host said application functional component.

3. The resource assignment method of claim 1 wherein said mapping process determines which server nodes are assigned to an application functional component and is captured in an assignment decision variable.

4. The resource assignment method of claim 3 wherein said assignment decision variable is optimized in accordance with a desired objective including meeting application requirements.

5. The resource assignment method of claim 3 wherein said desired objective further includes minimizing communication delays.

6. The resource assignment method of claim 3 wherein a layered partitioning and pruning (LPP) process is utilized to find an application resource assignment optimal solution.

7. A resource allocation system comprising:
   a means for gathering information parameters associated with topology and performance characteristics of available networked resources, said parameters comprising:
   a number of edge switches, a number of rack switches, a number of server nodes, and connectivity matrices between different layers; and
   a specification of the bandwidth limits of the incoming and outgoing links at various layers of the network;
   a means for extracting information associated with application functional components and resource requirements; and
   a means for assigning application functional components to said available networked resources including a means identifying infeasible networked resources and partitioning the available networked resources in accordance with a resource allocation variable, wherein said means for assigning uses information about which application functional components communicate with each other as a part of assigning said application functional components to said available networked resources and wherein said means for assigning enables assigning first information associated with a first set of available networked resources with first information associated with a first set of application functional components and assigning second information associated with a second set of available networked resources with second information associated with a second set of application functional components.

8. A resource allocation system of claim 7 wherein said means for assigning application functional components to said available networked resources allocates, said available networked resources by maximizing said available networked resources identified in said resource allocation variable with respect to application constraints and desired objectives.

9. The resource allocation system of claim 7 wherein said information associated with said available networked resources includes configuration and performance characteristics of said available networked resources.

10. The resource allocation system of claim 9 wherein said information associated with said application functional components includes organization and networked resource requirements of said application functional components.

11. The resource allocation system of claim 10 wherein said means for assigning application functional components to said available networked resources includes a means for simplifying said assignment analysis by identifying infeasible networked resources and partitioning said available networked resources.

* * * * *

UNITED STATES PATENT AND TRADEMARK OFFICE
CERTIFICATE OF CORRECTION

PATENT NO.         : 7,310,673 B2
APPLICATION NO.    : 10/032105
DATED              : December 18, 2007
INVENTOR(S)        : Xiaoyun Zhu et al.

It is certified that error appears in the above-identified patent and that said Letters Patent is hereby corrected as shown below:

In column 13, line 21, in Claim 1, after "network" delete ":" and insert -- ; --, therefor.

In column 14, line 35, in Claim 8, after "allocates" delete ",".

Signed and Sealed this

Twenty-seventh Day of May, 2008

JON W. DUDAS
*Director of the United States Patent and Trademark Office*